(12) United States Patent
Nagata

(10) Patent No.: US 9,152,224 B2
(45) Date of Patent: Oct. 6, 2015

(54) MOBILE TERMINAL DEVICE, STORAGE MEDIUM AND SCREEN UPDATING METHOD

(71) Applicant: KYOCERA Corporation, Kyoto (JP)

(72) Inventor: Shunsuke Nagata, Daito (JP)

(73) Assignee: KYOCERA Corporation, Kyoto (JP)

( * ) Notice: Subject to any disclaimer, the term of this patent is extended or adjusted under 35 U.S.C. 154(b) by 182 days.

(21) Appl. No.: 13/713,619

(22) Filed: Dec. 13, 2012

(65) Prior Publication Data

US 2013/0159888 A1 Jun. 20, 2013

(30) Foreign Application Priority Data

Dec. 16, 2011 (JP) .................................. 2011-275585

(51) Int. Cl.
*G06F 3/048* (2013.01)
*G06F 3/01* (2006.01)
*G06F 17/30* (2006.01)

(52) U.S. Cl.
CPC .............. *G06F 3/01* (2013.01); *G06F 17/3089* (2013.01)

(58) Field of Classification Search
CPC ................ G06F 17/30; G06F 11/1438; G06F 17/30345; G06F 17/30861
USPC .......................................... 715/783, 789, 807
See application file for complete search history.

(56) References Cited

U.S. PATENT DOCUMENTS

| | | | | |
|---|---|---|---|---|
| 6,278,448 B1 * | 8/2001 | Brown et al. | ................ | 715/866 |
| 7,325,188 B1 * | 1/2008 | Covington et al. | ........... | 715/234 |
| 7,681,143 B2 * | 3/2010 | Lindsay et al. | ............... | 715/788 |
| 2003/0023638 A1 * | 1/2003 | Weight | ........................ | 707/526 |
| 2005/0022139 A1 * | 1/2005 | Gettman et al. | ............... | 715/850 |
| 2005/0283734 A1 * | 12/2005 | Santoro et al. | ................ | 715/765 |
| 2006/0053384 A1 * | 3/2006 | La Fetra et al. | ............... | 715/765 |
| 2006/0123356 A1 * | 6/2006 | Sobeski et al. | ................ | 715/781 |
| 2007/0044029 A1 * | 2/2007 | Fisher et al. | .................. | 715/762 |
| 2008/0034309 A1 * | 2/2008 | Louch et al. | .................. | 715/766 |
| 2010/0313149 A1 * | 12/2010 | Zhang et al. | .................. | 715/760 |
| 2011/0197150 A1 * | 8/2011 | Huang | .......................... | 715/760 |
| 2012/0284245 A1 * | 11/2012 | Portnoy et al. | ................ | 707/706 |
| 2013/0111368 A1 * | 5/2013 | Laughlin | ....................... | 715/760 |

FOREIGN PATENT DOCUMENTS

| | | | |
|---|---|---|---|
| JP | 2003-169375 A | 6/2003 | |
| JP | 2005-050019 A | 2/2005 | |
| JP | 2009-070412 A | 4/2009 | |

OTHER PUBLICATIONS

Notification of Reasons for Refusal dated Apr. 7, 2015, issued in counterpart Japanese Application No. 2011-275585.

* cited by examiner

*Primary Examiner* — Omar Abdul-Ali

(74) *Attorney, Agent, or Firm* — Procopio, Cory, Hargreaves & Savitch LLP

(57) ABSTRACT

A mobile terminal device includes a storage module which stores two or more screens of web pages; a receiving module which receives an operation to collectively update predetermined screens of the web pages stored in the storage module; an acquisition module which acquires information for generating the predetermined screens of the web pages through a communication network, in response to the operation; and an updating module which collectively updates, based on the acquired information, the predetermined screens of the web pages stored in the storage module.

4 Claims, 16 Drawing Sheets

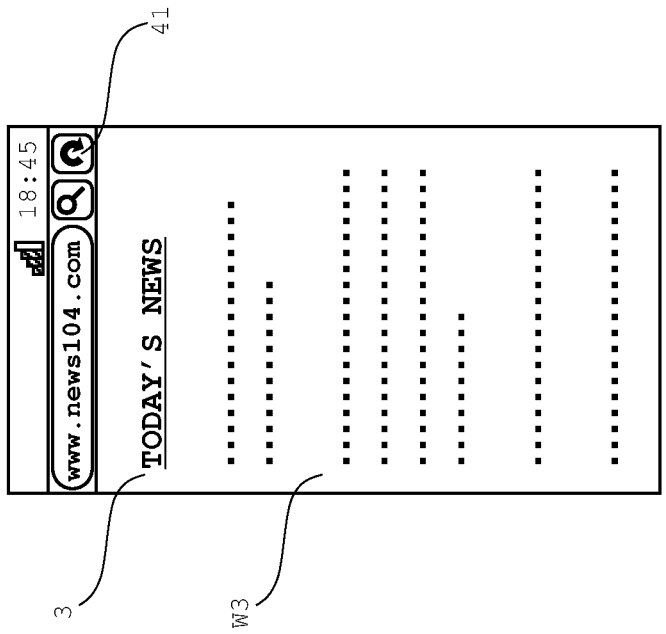
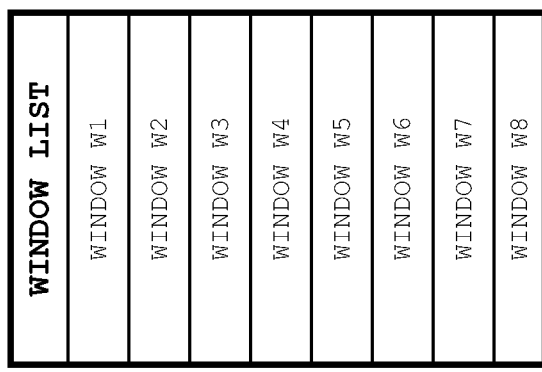

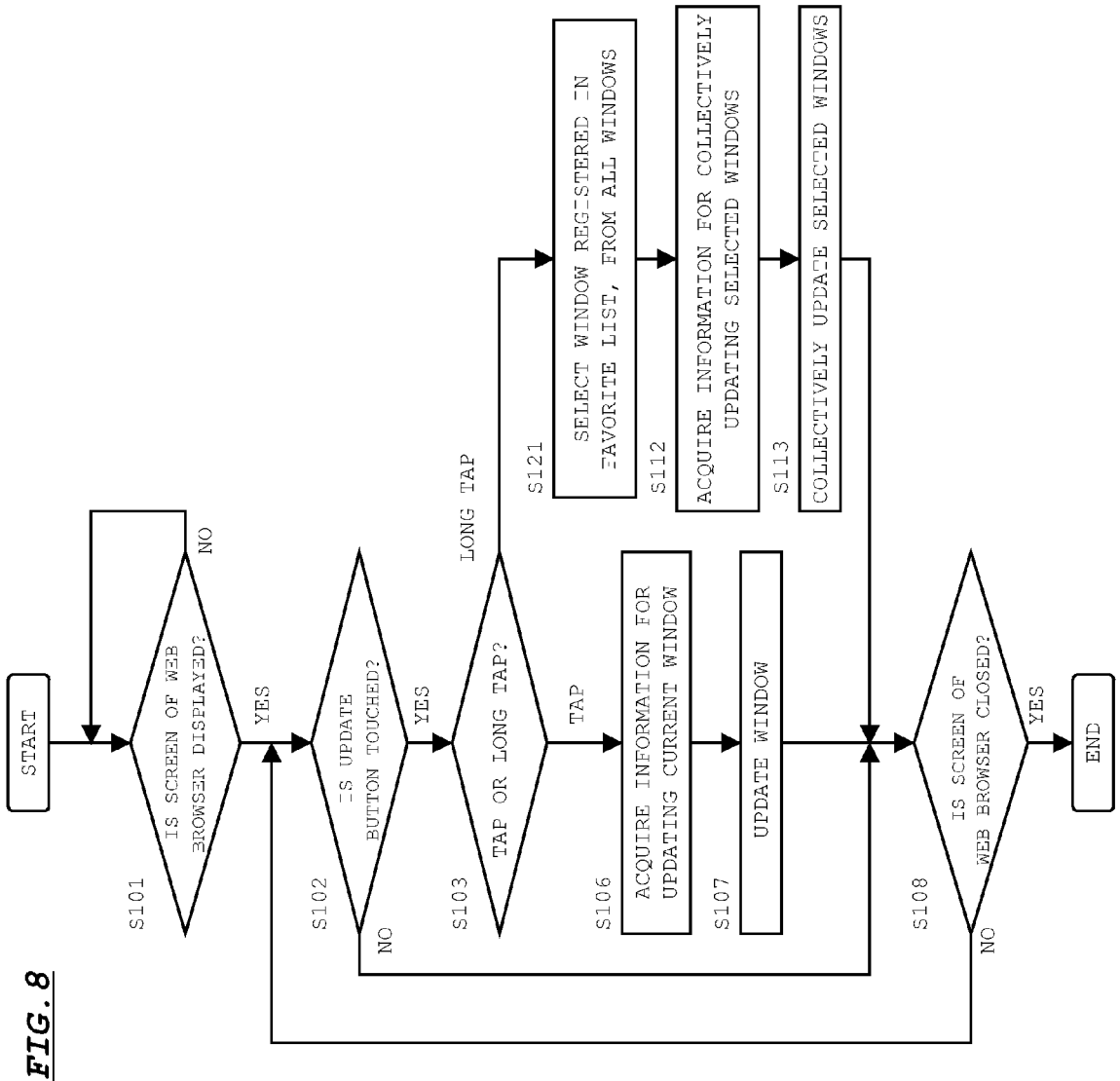

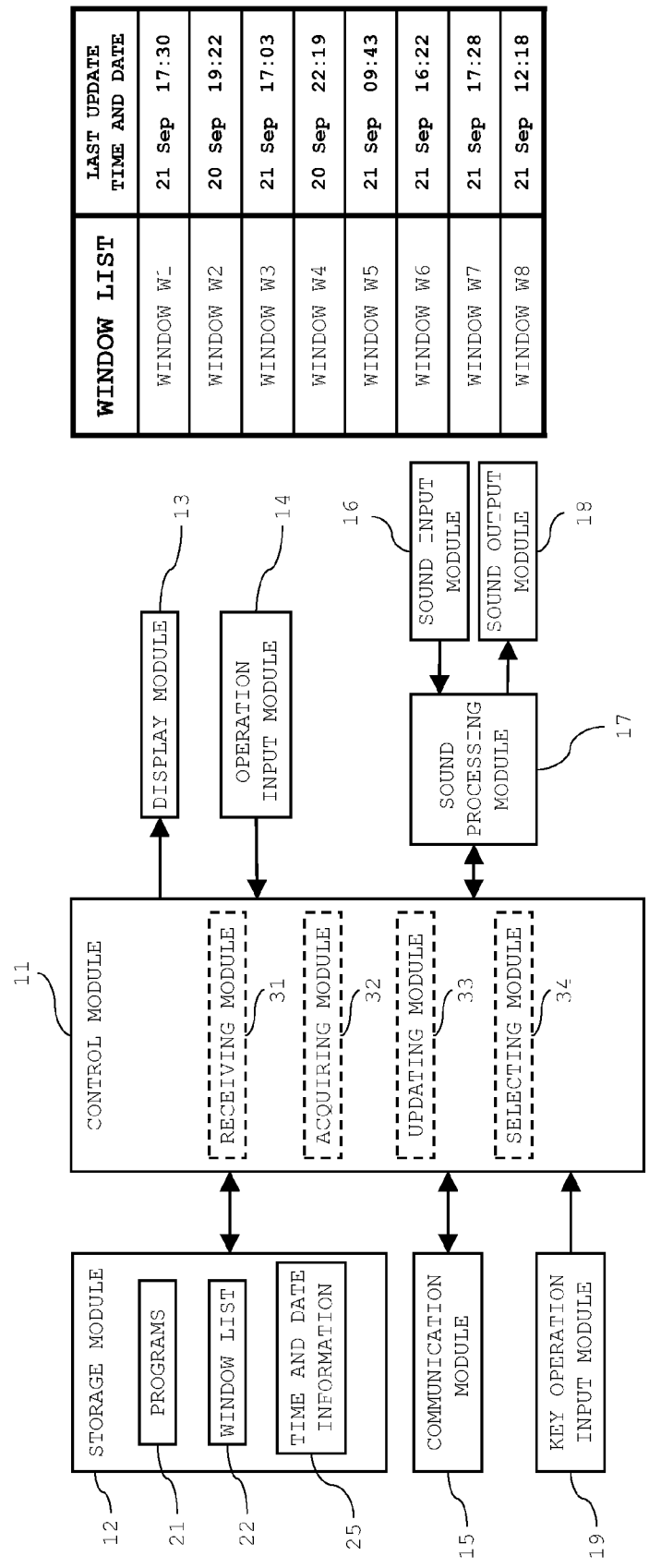

MOBILE TERMINAL DEVICE, STORAGE MEDIUM AND SCREEN UPDATING METHOD

This application claims priority under 35 U.S.C. Section 119 of Japanese Patent Application NO. 2011-275585 filed Dec. 16, 2011, entitled "MOBILE TERMINAL DEVICE, PROGRAM AND SCREEN UPDATING METHOD". The disclosure of the above application is incorporated herein by reference.

BACKGROUND OF THE INVENTION

1. Field of the Invention

The present invention relates to a mobile terminal device such as a mobile phone, a PDA (Personal Digital Assistant), a tablet PC, and an electronic book reader; a storage medium storing a computer program suitable for use in the mobile terminal device; and a display control method suitable for use in the mobile terminal device.

2. Disclosure of Related Art

Conventionally, there has been known a mobile terminal device provided with a web browser function of switching and browsing two or more screens of web pages. In such a web browser, a screen of web page being displayed can be updated to an up-to-date screen of the web page through an update operation of a user.

In order to update two or more screens of web pages, however, the user needs to perform an update operation for every screen of a web page. It is troublesome for the user to perform the update operations more than once to update the two or more screens of the web pages.

SUMMARY OF THE INVENTION

A first aspect of the invention is directed to a mobile terminal device. The mobile terminal device according to the first aspect includes a storage module which stores two or more screens of web pages; a receiving module which receives an operation to collectively update predetermined screens of the web pages stored in the storage module; an acquisition module which acquires information for generating the predetermined screens of the web pages through a communication network, in response to the operation; and an updating module which collectively updates, based on the acquired information, the predetermined screens of the web pages stored in the storage module.

A second aspect of the invention is directed to a storage medium which stores a computer program to be applied to a mobile terminal device. The mobile terminal device is provided with a storage module. The computer program is configured to provide a computer in the mobile terminal device with a function of receiving an operation to collectively update predetermined screens of two or more screens of web pages stored in the storage module; a function of acquiring information for generating the predetermined screens of the web pages through a communication network, in response to the operation; and a function of collectively updating, based on the acquired information, the predetermined screens of the web pages stored in the storage module.

A third aspect of the invention is directed to a screen updating method for a mobile terminal device provided with a storage module. The screen updating method according to the third aspect includes a step of receiving an operation to collectively update predetermined screens of two or more screens of web pages stored in the storage module; a step of acquiring information for generating the predetermined screens of the web pages through a communication network, in response to the operation; and a step of collectively updating, based on the acquired information, the predetermined screens of the web pages stored in the storage module.

BRIEF DESCRIPTION OF THE DRAWINGS

These and other objects, and novel features of the present invention will become more apparent upon reading the following detailed description of the embodiment along with the accompanying drawings.

FIGS. 3A and 3B are diagrams showing an example of a window list and a display example of a web page respectively, according to the embodiment.

FIG. 8 is a flow chart showing an update process for updating the window registered in the window list according to the embodiment.

FIGS. 9A and 9B are respectively a block diagram showing an overall configuration of a mobile phone according to an embodiment, and a table showing final update time and date of windows registered in a window list.

Figure 1:
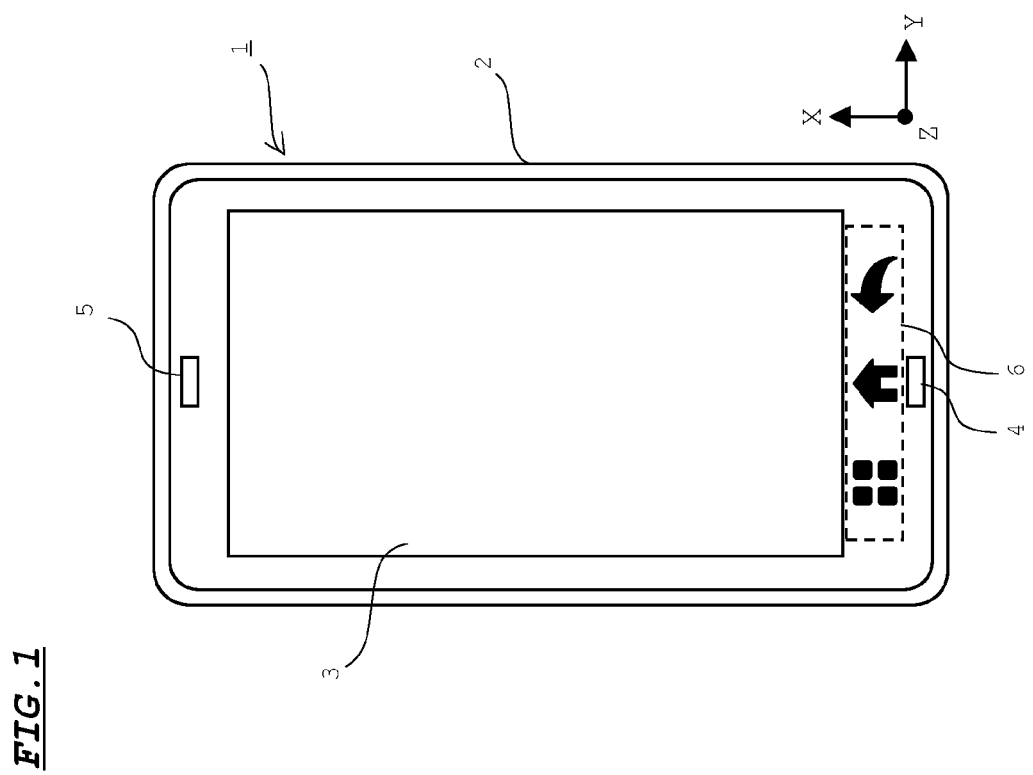
FIG. 1 is a diagram showing an external configuration of a mobile phone embodying the invention.

The drawings are provided mainly for describing the present invention, and do not limit the scope of the present invention.

DESCRIPTION OF PREFERRED EMBODIMENTS

In the following, an embodiment of the invention is described referring to the drawings.

FIG. 1 is a front view showing an external configuration of a mobile phone 1.

The mobile phone 1 is provided with a cabinet 2, a display surface 3, a microphone 4, a speaker 5, and a key operation part 6.

The display surface 3 is disposed on the front surface of the cabinet 2. The display surface 3 corresponds to a display surface of a display module (FIG. 2) which displays a screen, to be described below.

The microphone 4 outputs an electrical signal in accordance with an inputted sound to a sound processing module (FIG. 2A) to be described later. The speaker 5 outputs a sound in accordance with an electrical signal to be inputted from the sound processing module.

The key operation part 6 is provided on the cabinet 2. The key operation part 6 is composed of keys such as soft keys and hard keys. Various functions in accordance with e.g. a running program are assigned to the respective keys of the key operation part 6.

Figure 2:
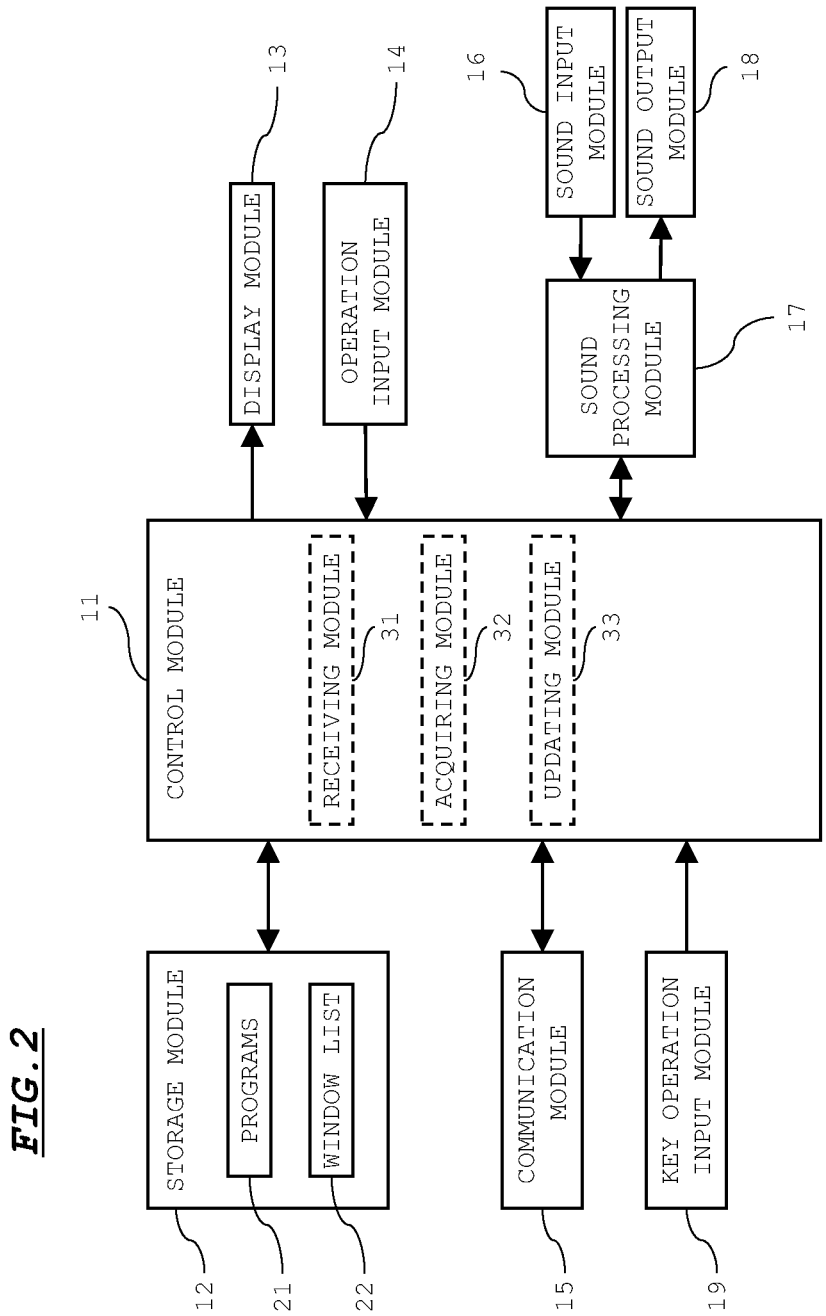
FIG. 2 is a block diagram showing an overall configuration of the mobile phone according to the embodiment.

FIG. 2 is a block diagram showing an overall configuration of the mobile phone 1.

The mobile phone 1 is provided with a control module 11, a storage module 12, a display module 13, an operation input module 14, a communication module 15, a sound input module 16, a sound processing module 17, a sound output module 18, and a key operation input module 19.

The storage module 12 is constituted of e.g. an ROM and an RAM. The storage module 12 stores therein programs 21. The programs 21 are constituted of a control program for controlling the modules of the mobile phone 1, and various application programs (hereinafter, simply referred to as "applications") (such as a web browser application, an electronic mail application, a phonebook application, and an electronic book browser application). The programs 21 also include programs for executing functions of a receiving module 31, an acquisition module 32, an updating module 33, and a selecting module 34 to be described later.

The storage module 12 is also used as a working area which stores data to be temporarily used or generated in the course of executing the programs 21.

The control module 11 is constituted of e.g. a CPU. The control module 11 executes various applications by controlling the modules constituting the mobile phone 1 such as the storage module 12, the display module 13, the operation input module 14, the sound input module 16, the sound processing module 17, the sound output module 18, and the key operation input module 19 in accordance with the control program.

The display module 13 displays a screen on the display surface 3, based on a control signal and an image signal from the control module 11. The display module 13 is constituted of e.g. a liquid crystal display. The display module 13 may be constituted of other display device such as an organic EL display, in place of a liquid crystal display.

The operation input module 14 is constituted of e.g. a touch sensor for detecting contact of an object such as a user's fingertip or a touch pen (hereinafter, simply called as "the fingertip") with the display surface 3. The touch sensor is integrally formed with the liquid crystal display to thereby constitute a touch panel. The touch sensor is formed into a transparent sheet-like member, and is disposed in such a manner as to cover the display surface 3.

The operation input module 14 receives input of a manipulation on the display surface 3 by touching the surface with a fingertip. The operation input module 14 detects a position on the display surface 3 where the fingertip has touched, as an input position; and outputs a position signal in accordance with the detected input position to the control module 11.

The user is allowed to perform various manipulations such as touching, tapping, long tapping, sliding, and flicking on the display surface 3 by contacting the fingertip with the display surface 3. In the specification, "touching" is a manipulation of touching the display surface 3 with the fingertip; "tapping" is a manipulation of tapping the display surface 3 with the fingertip for a predetermined time, followed by releasing the fingertip from the display surface 3; "long tapping" is a manipulation of touching the display surface 3 with the fingertip followed by releasing the fingertip from the display surface 3 after predetermined time which is longer than that of "tapping" elapses; "flicking" is a manipulation of flicking the display surface 3 with the fingertip (manipulation of touching the display surface 3 with the fingertip, followed by moving the fingertip at a certain speed on the display surface 3 and releasing the fingertip from the display surface 3); and "sliding" is a manipulation of slidably moving the fingertip on the display surface 3 for a certain distance while keeping the fingertip in contact with the display surface 3, followed by releasing the fingertip from the display surface 3.

The touch sensor constituting the operation input module 14 may be any one of various types of touch sensors such as electrostatic capacitive sensors, ultrasonic sensors, pressure sensitive sensors, resistive sensors, and photosensitive sensors.

The communication module 15 is provided with an antenna for transmitting/receiving radio wave for use in a phone call or communication. The communication module 20 converts a signal for use in a phone call or communication to be inputted from the control module 11 into a radio signal, and transmits the converted radio signal to a communication destination such as a base station or other communication device via the antenna. Further, the communication module 20 converts the radio signal received via the antenna into a signal of a format usable by the control module 11, and outputs the converted signal to the control module 11.

The sound input module 16 is constituted of e.g. the microphone 4, and outputs an electrical signal from the microphone 4 to the sound processing module 17. The sound processing module 17 performs e.g. A/D conversion on the electrical signal from the sound input module 16, and outputs to the control module 11 a digital sound signal which has undergone the A/D conversion. The sound processing module 17 performs e.g., decoding and D/A conversion on the digital sound signal from the control module 11, and outputs to the sound output module 18 an electrical signal which has undergone the D/A conversion. The sound output module 18 is constituted of e.g. the speaker 5. The sound output module 18 inputs the electrical signal from the sound processing module 17, and outputs a sound from the speaker 5.

The key operation input module 19 outputs, to the control module 11, a signal corresponding to each key in response to user's depressing the keys in the key operation part 6.

The web browser, which is an application stored in the storage module 12, is provided with a function of switchably displaying two or more screens of web pages. More correctly, "displaying" (or "opening") a web page means that the control module 11 displays a screen of a web page (hereinafter referred to as a "window") on the display surface 3 by controlling the display module 13 based on execution of the web browser.

FIG. 3A is a table showing an example of a window list 22 stored in the storage module 12. Eight windows W1 to W8 are registered in the window list 22 shown in FIG. 3A. FIG. 3B is a display example of the window (W3) of the web page. Any number of windows other than 8 may be registered in the window list 22.

When the operation input module 14 detects an operation to select any of the windows W1 to W8, the control module 11 displays the selected window W1 to W8 on the display surface 3. This configuration allows the user to switchably display two or more windows W1 to W8.

The control module 11 newly registers windows W1 to W8 in the window list 22 and timely updates the windows W1 to W8 registered in the window list 22. For example, when the web browser is started while the window list 22 is in an initial empty state, the control module 11 displays the window W1 of a predetermined home page (web page) on the display surface 3, and registers it in the window list 22.

The control module 11 acquires, through a communication network (such as an Internet), information necessary for generating the window W1 in the course of displaying the window W1, from a web server which manages a web site corresponding to the window W1. The control module 11 generates the window W1 based on the acquired information.

After this, when an operation to specify a URL on a screen based on other application is performed, for example, the control module 11 starts the web browser, displays on the display surface 3 the window W2 of a web page corresponding to the specified URL, and newly registers the window W2 in the window list 22. Then, the two windows W1 and W2 are registered in the window list 22.

When an operation to select a website (for example, a news site) from a bookmark of the web browser is performed as an operation separate from the above operation, the control module 11 displays on the display surface 3 the window W3 of the selected web page, and registers the window W3 in the window list 22. Then, the three windows W1 to W3 are registered in the window list 22.

Subsequently, based on a similar registration operation, the windows W4 through W8 are registered in the window list 22 (FIG. 3A).

The control module 11 updates a window currently displayed on the display surface 3, based on a manipulation of tapping Update button 41 as shown in FIG. 3B. For example, when the window W3 is now displayed on the display surface 3, for example, and the operation input module 14 detects a tap on the Update button 41, the control module 11 updates the display of the window W3 which is a current display target. Specifically, the control module 11 newly acquires information for generation and generates a new window. The control module 11 updates the window W3 being displayed to the newly generated window. Then, the control module 11 updates the window W3 registered in the window list 22 to the newly generated window.

As described below, this further provides the mobile phone 1 according to the embodiment with a function of collectively updating the windows W1 to W8 registered in the window list 22.

In the following, the embodiment will be described with the window list 22, in which the eight windows W1 to W8 are registered, as an example.

The control module 11 is provided with a receiving module 31, an acquisition module 32, and an updating module 33 (FIG. 2). The receiving module 31, the acquisition module 32, and the updating module 33 are embodied as a function of a program to be executed by the control module 11.

The receiving module 31 receives an operation to collectively update (hereinafter referred to as a "collective updating operation") the windows W1 to W8 registered in the window list 22. When the operation input module 14 detects a manipulation of long tapping the Update button 41, the receiving module 31 receives the manipulation as an operation to collectively update the windows W1 to W8. When the operation input module 14 detects a manipulation of tapping the Update button 41, the receiving module 31 receives the manipulation as an operation to update the currently displayed window.

When the receiving module 31 receives a collective updating operation, the acquisition module 32 acquires information (e.g. html file, image) for generating the windows W1 to W8 needed for collective updating from a web server, through a communication network. Furthermore, when the receiving module 31 receives an operation to update one of the windows W1 to W8, the acquisition module 32 acquires information for generating the windows W1 to W8 needed for updating from the web server.

When information used last time for generating the windows W1 to W8 is cached in the storage module 12, the acquisition module 32 may control acquisition of the already cached information by comparing an update time and date of the cached information with an update time and date of information to be acquired. This reduces an amount of data to be communicated.

The updating module 33 newly generates a window, based on information acquired by the acquisition module 32. The updating module 33 updates the windows W1 to W8 registered in the window list 22 in the storage module 12 by replacing the windows W1 to W8 with newly generated windows. As the windows W1 to W8 are updated by the updating module 33, the control module 11 updates displays of the windows W1 to W8 appearing on the display surface 3.

Figure 4:
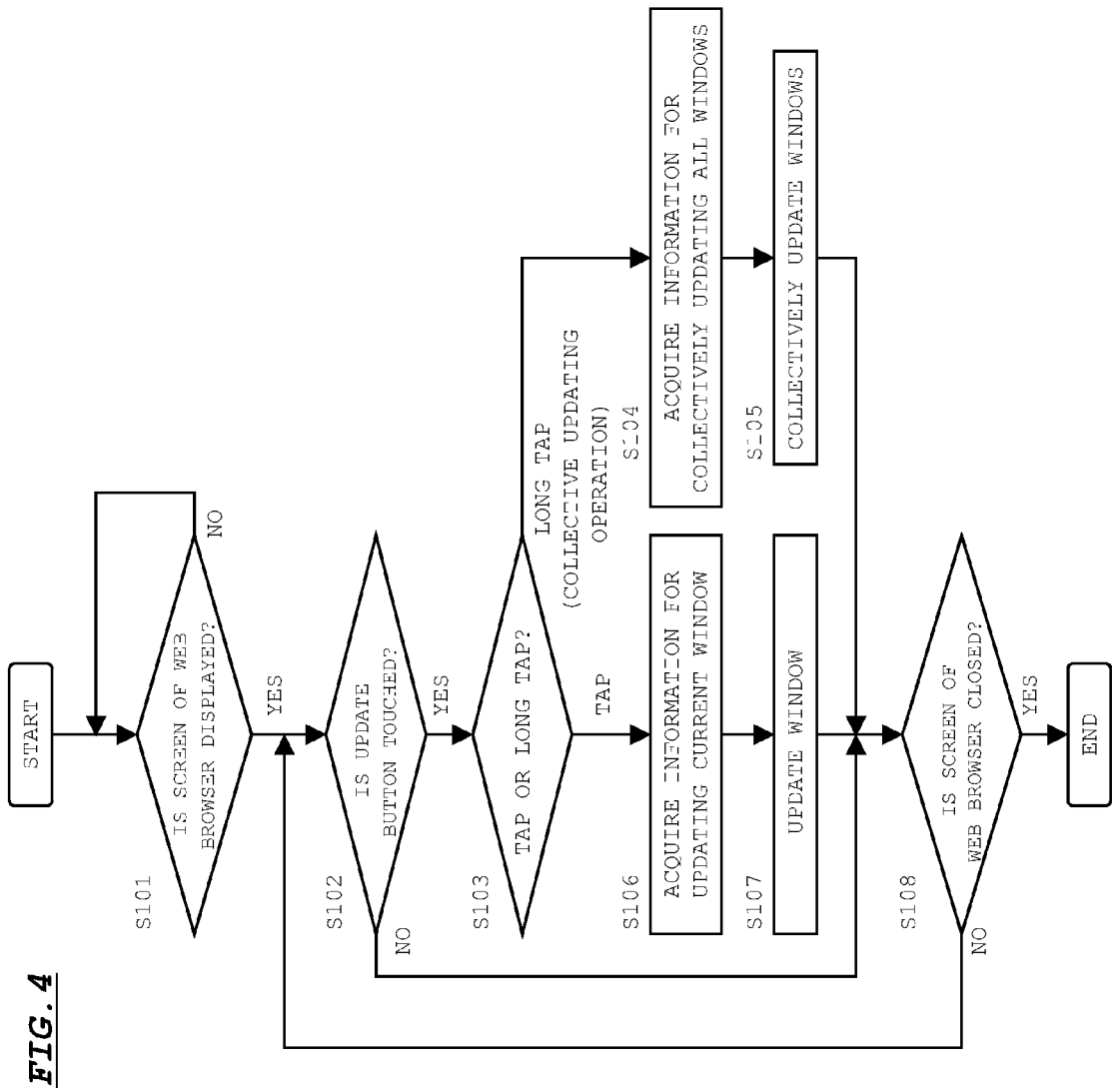
FIG. 4 is a flow chart showing an update process for updating a window registered in the window list according to the embodiment.

FIG. 4 is a flow chart showing an update process for updating windows W1 to W8 registered in the window list 22. The update process is performed while a screen based on execution of the web browser is displayed on the display surface 3.

A screen based on execution of the web browser, for example, the window (See FIG. 3B), is displayed on the display surface 3 (S101: YES), the receiving module 31 monitors a manipulation to be done on the Update button 41 (S102, S103). When a manipulation detected by the operation input module 14 is touching on the Update button 41 (S102: YES) and the manipulation is long tapping (S103: long tap), the receiving module 31 receives the manipulation as a collective updating operation. In this case, for all the windows W1 to W8 registered in the window list 22, the acquisition module 32 acquires information for updating the windows W1 to W8 from the web server (S104). Based on the acquired information (each piece of information on each of the windows W1 to W8), the updating module 33 updates respective windows W1 to W8 registered in the window list 22 in the storage module 12 (S105).

When a manipulation detected by the operation input module 14 is touching on the Update button 41 (S102: YES) and the manipulation is a tap (S103: tap), the receiving module 31 receives the manipulation as an operation to update a currently displayed window Wi (i=1 to 8) in the window list 22. In this case, the acquisition module 32 acquires information for updating the window Wi (S106). The updating module 33 updates the window Wi in the storage module 12 (S107), based on the acquired information.

When a window is updated in the storage module 12 by the processes in Steps S105 and S107, the control module 11 updates a display of the window currently displayed on the display surface 3. A new updated window is displayed on the display surface 3.

After the processes in Steps S105 and S107 end, and when no touch on the Update button 41 is detected in Step S102, the control module 11 proceeds to a process in Step S108. In Step S108, when the operation input module 14 detects a manipulation to close a screen based on execution of the web browser (S108: YES), the control module 11 terminates the update process shown in FIG. 4. When the operation input module 14 does not detect the manipulation to close a screen based on execution of the web browser (S108: NO), the control module 11 returns to the process in Step S102.

Usually, the web browser is provided with a function of updating a screen of a web page being displayed in response to a predetermined operation. In order to update two or more screens of web pages, however, it is essential to perform the predetermined operations more than once. It is troublesome for a user to perform such operations more than once.

With the update operation (FIG. 4) described above, however, the user can collectively update the windows W1 to W8 registered in the window list 22 by performing the collective updating operation (manipulation of long tapping the Update button 41). Specifically, the collective updating operation updates the window currently displayed on the display surface 3 as well as windows not currently displayed on the display surface 3. Therefore, when the user displays a different window on the display surface 3 by switching a display target window, for example, the user can browse an up-to-date window without performing a separate update operation.

As described above, with the embodiment, all windows W1 to W8 registered in the window list 22 are collectively updated in response to a collective updating operation of a user. Thus, the user can collectively update two or more screens of web pages without difficulty.

In order to reduce an amount of data in information to be collectively acquired, a process of limiting target windows of collective updating may be performed. The operation to limit collective updating targets may be performed based on various conditions. For example, as described in the following first through fifth modifications, a configuration may be adopted which limits a target window of collective updating based on a number of updates of a web page, favorite registration status, an amount of data in a web page, and a communication method to be used in acquiring information.

First Modification

Figure 5:
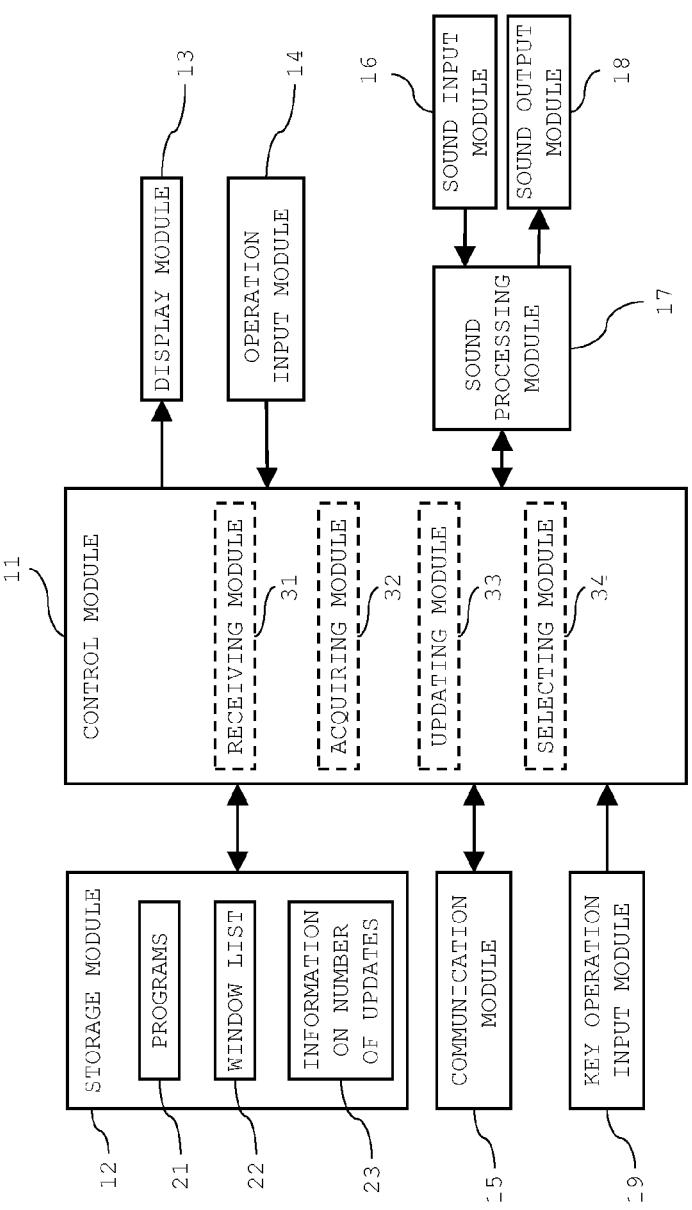
FIGS. 5A and 5B are respectively a block diagram showing an overall configuration of a mobile phone and a table showing a number of updates of windows listed in a window list, according to an embodiment.

FIG. 5A is a block diagram showing an overall configuration of a mobile phone 1 according to a first modification. A storage module 12 stores information 23 on a number of updates of windows W1 to W8. A control module 11 is provided with a selecting module 34, in addition to a receiving module 31, an acquisition module 32, and an updating module 33.

FIG. 5B is a table showing a window list 22 and an example of content of the information 23 on a number of updates of a window list 22. The information 23 on a number of updates is constituted of data showing a number of updates n1 to n8 of respective windows W1 to W8 registered in the window list 22.

Figure 6:
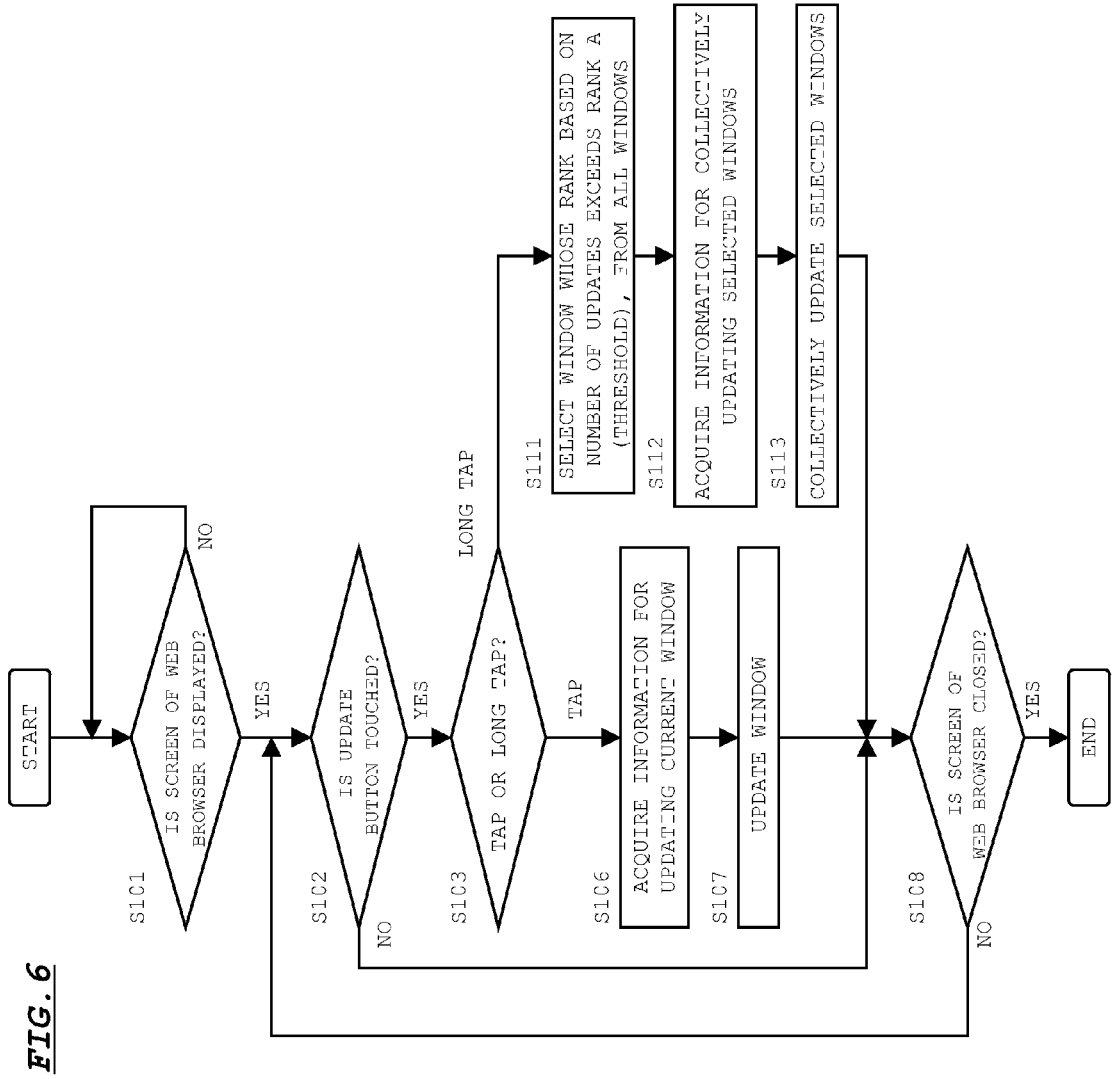
FIG. 6 is a flow chart showing an update process for updating the window registered in the window list according to the embodiment.

FIG. 6 is a flow chart showing an update process for updating windows W1 to W8 registered in a window list 22, according to the embodiment. In the flow chart shown in FIG. 6, processes in Steps S111 through S113 replace the processes in Steps S104 and S105 in the flow chart shown in FIG. 4.

When a window Wi (i=1 to 8) is newly registered in the window list 22, the control module 11 sets a number of updates ni of the window Wi to an initial value 0 (ni=0). Subsequently, whenever the window Wi registered in the widow list 22 is updated (S107, S113), the control module 11 adds only 1 to the number of updates ni of the window Wi.

In the example shown in FIG. 5B, the number of updates n1 to n8 of the windows W1 to W8 are respectively 1 time, 0 time, 9 times, 2 times, 10 times, 4 times, 12 times, and 3 times.

The selecting module 34 selects a window which satisfies a predetermined selection condition for limiting an update target, from among the windows W1 to W8 registered in the window list 22. The selection condition is that a rank based on the number of updates n1 to n8 of the windows W1 to W8 exceeds a predetermined threshold (for example, the third rank). The predetermined threshold (1 to 8) is set as appropriate.

With reference to the flow chart shown in FIG. 6, when the receiving module 31 receives a window collective update operation (S102: YES→S103: long tap), the selecting module 34 selects the window whose rank related to the number of updates n1 to n8 falls within a rank A (A is a threshold. For example, A=3) from the windows W1 to W8. In the case of an example as shown in FIG. 5B, the selecting module 34 selects the window W3 (third rank), W5 (second rank), and W7 (first rank) from the windows W1 to W8 (S111).

In the first modification, the acquisition module 32 and the updating module 33 selectively perform processes similar to Steps S104 and S105 on the selected windows W3, W5, W7 (S112, S113). Specifically, the acquisition module 32 selectively acquires information for generating the windows W3, W5, W7 selected by the selecting module 34 (S112). More specifically, the acquisition module 32 does not acquire from the web server information for generating the windows W1, W2, W4, W6, W8 not selected by the selecting module 34.

Based on the information acquired by the acquisition module 32, the updating module 33 updates the windows W3, W5, W7 selected by the selecting module 34 in the storage module 12 (S113).

As described above, with the configuration of the first modification, in response to the collective updating operation of the user, the windows selected by the selecting module 34 are selectively updated, among the windows W1 to W8 registered in the window list 22. Compared with a case in which all of the windows W1 to W8 registered in the window list 22 are unconditionally updated, this can reduce an amount of data to be required to acquire information for generating a window.

Since the amount of data required to acquire information can be reduced, time needed in communications is reduced. In addition, electric power required for communications is also saved.

Among the windows W1 to W8 registered in the window list 22, the selecting module 34 selects a window whose rank related to the number of updates ni exceeds the threshold (rank A), i.e., a window with high frequency of updating by the user. The acquisition module 32 does not newly acquire information for generating a window whose frequency of updating by the user is not high. A window whose frequency of updating by the user is not high is less likely to be browsed by the user in the future than a window with high updating frequency. Therefore, when an update target window is even limited as described above, a window which is more likely to be browsed by the user is selectively updated. When a display of the window more likely to be browsed is switched again, there is no need for an update operation on a displayed window, which is convenient.

The selecting module 34 may also select a window whose rank based on the number of updates n1 to n8 is lower than the predetermined threshold. In this case, since information on a web page corresponding to a window with low updating frequency is updated suitably, displaying of windows based on old information is controlled.

The selecting module 34 may be such configured that it limits and selects an update target window, based on a predetermined threshold related to the number of updates n1 to n8, in place of the threshold A related to the rank based on the number of updates. In this case, for example, a window whose number of updates exceeds a predetermined number of N times is selectively updated. Alternatively, a window whose number of updates is lower than the predetermined number of N times is selectively updated.

The selecting module 34 may select a window based on the number of updates of the windows W1 to W8 in a certain period of time (for example, e.g. from one hour before to now, one day before to now), in place of a period from registration to the window list 22 to now.

Second Modification

Figure 7B:
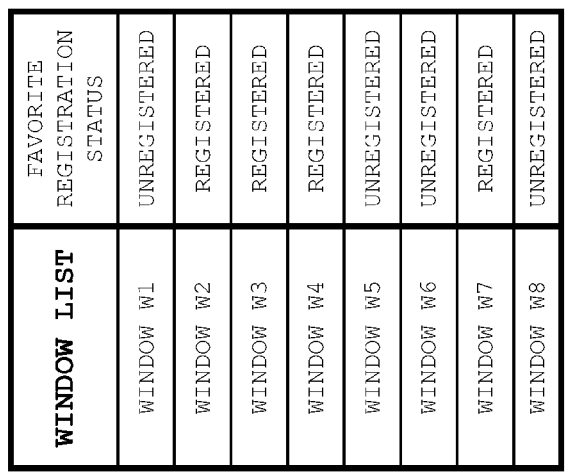
FIGS. 7A and 7B are respectively a block diagram showing an overall configuration of a mobile phone and a table showing registration status in a favorite list of windows registered in a window list according to an embodiment.
Figure 7A:
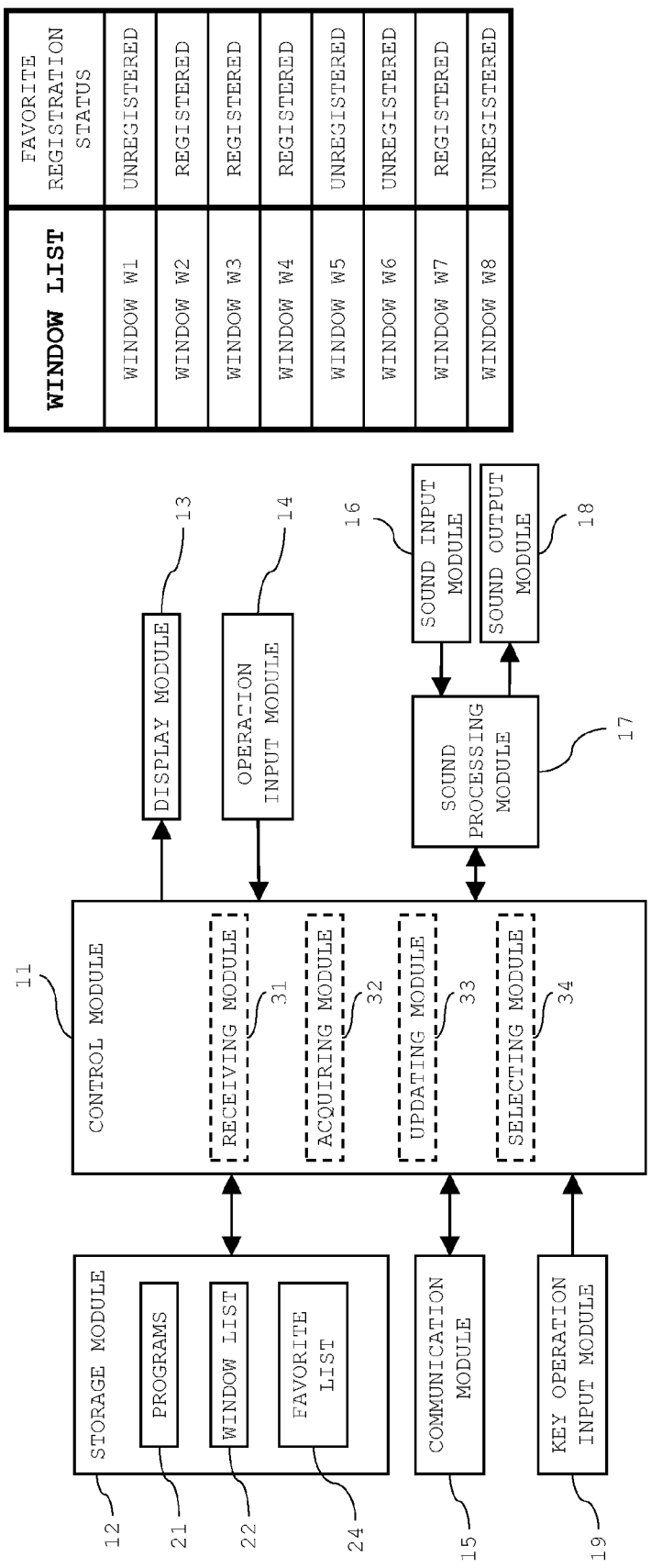

FIG. 7A is a block diagram showing an overall configuration of a mobile phone 1 according to a second modification. A storage module 12 stores a favorite list 24. Similar to the first modification, a control module 11 is provided with a selecting module 34. The selecting module 34 according to the second modification refers to a favorite list 24 and selects an update target window from a window list 22.

The favorite list 24 is a list for recording a URL of a web page so that a user can easily display a favorite window later. The control module 11 registers a URL specified by user's registration operation in the favorite list 24. The control module 11 displays a list of favorite lists 24 on a display surface 3, and displays a web page corresponding to a selected URL on the display surface 3 when the user selects any URL in the list.

FIG. 7B is a table showing the window list 22 and an example of registration status in the favorite list 24 of windows W1 to W8 registered in the window list 22. In the example shown in FIG. 7B, the windows W1, W5, W6, W8 are not registered in the favorite list 24 (unregistered). The windows W2, W3, W4, W7 are registered in the favorite list 24.

FIG. 8 is a flow chart showing an update process for updating the windows registered in the window list 22. In the flow chart shown in FIG. 8, a process of Step S121 replaces the process of Step S111 in the flow chart shown in FIG. 6.

In Step S121, the selecting module 34 selects the window registered in the favorite list 24 from the windows W1 to W8. In the case of the example shown in FIG. 7B, the selecting module 34 selects the windows W2, W3, W4, W7.

As described above, with the configuration of the second modification, while an acquisition module 32 acquires information for generating the windows registered in the favorite list 24 among the windows W1 to W8 registered in the window list 22 in response to a collective update operation by the user, the acquisition module does not acquire information for generating the windows not registered in the favorite list 24. Thus, when an update target window is even limited, the window of the page registered in the favorite list 24 which seems to be more likely to be browsed, is selectively updated. When a display is switched again to the window more likely to be browsed, the user does not have to perform the update process separately, which is convenient.

Third Modification

FIG. 9A is a block diagram showing an overall configuration of a mobile phone 1 according to a third modification. A storage module 12 stores time and date information 25 on registration and updating of a window. The time and date information 25 is constituted of data showing last update time and date of windows registered in a window list 22. A control module 11 is provided with a selecting module 34 which selects an update target window from the window list 22, by referring to the time and date information 25.

FIG. 9B is a table showing the window list 22 and an example of last update time and date of windows W1 to W8 registered in the window list 22. In the example shown in FIG. 9B, for example, the last update time and date of the window W1 is 17:30 on September 21. The last update time and date of the window W2 is 19:22 on September 20.

When a window is newly registered or the window is updated in the window list 22, the control module 11 associates time and date when the window is newly registered or updated with the window, and stores the time and date in the storage module 12. Thus, when the update time and date related to respective windows W1 to W8 is referred, the referred update time and date shows the last update time and date of the corresponding window W1 to W8.

Figure 10:
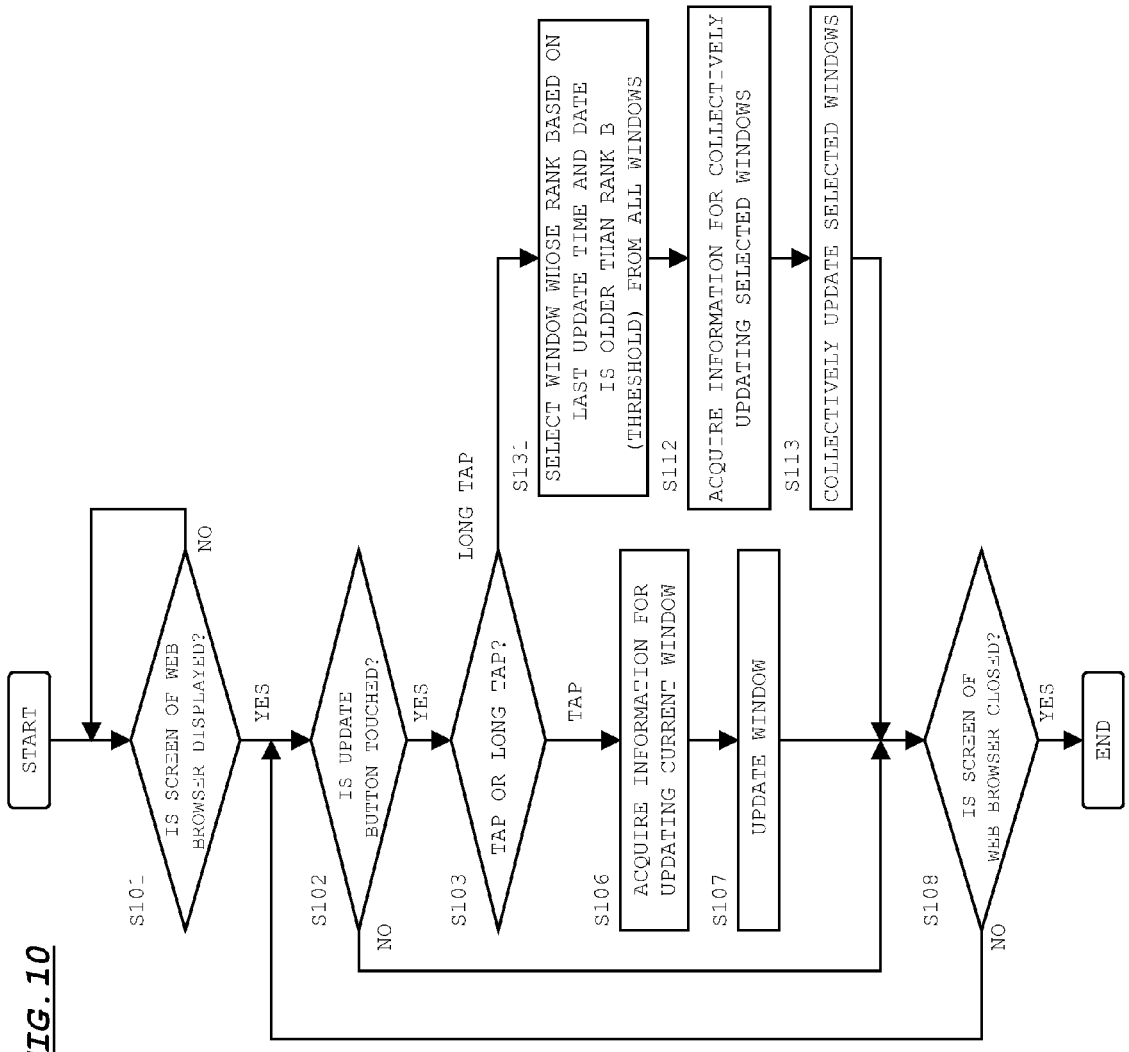
FIG. 10 is a flow chart showing an update process for updating the window registered in the window list according to the embodiment.

FIG. 10 is a flow chart showing an update process for updating the windows registered in the window list 22 according to the third modification. In the flow chart shown in FIG. 10, a process in Step S131 replaces the process in Step S111 in the flow chart shown in FIG. 6.

In Step S131, the selecting module 34 selects the window based on a condition that its rank related to the last update time and date of the windows W1 to W8 is older than a predetermined rank B (B is a threshold. For example, B=4). From the windows W1 to W8, the selecting module 34 selects the windows which meet the above predetermined condition, namely, in the example shown in FIG. 9B, the windows whose last update time is the oldest to the third oldest, i.e., the window W2 (oldest), W4 (second oldest), W5 (third oldest).

As described above, with the configuration of the third modification, the selecting module 34 selects the window whose rank related to the last update time and date is older than the predetermined threshold rank among the windows W1 to W8 registered in the window list 22. Since the window with old update time and date is updated, the windows W1 to W8 registered in the window list 22 are kept new, which thereby prevents any window based on old information from being displayed on the display surface 3.

In the above example, the selecting module 34 selects the window whose last update time and date is old (older than the rank B). However, the selecting module 34 may select the window whose last update time and date is new (for example, the newest to fourth newest windows). In this case, the window whose last update time and date is new, i.e., the window the user browsed most recently is updated more preferentially as having the possibility that it will be browsed again than the window whose last update time and date is old.

In the above example, the selecting module 34 selects the window based on the rank related to the last update time and date of the windows W1 to W8. However, the selecting module 34 may be configured to select the window depending on whether the last update time and date is older or newer than predetermined time (for example, one hour before, one day before) in place of the rank of the last update time and date.

Fourth Modification

Figure 11:
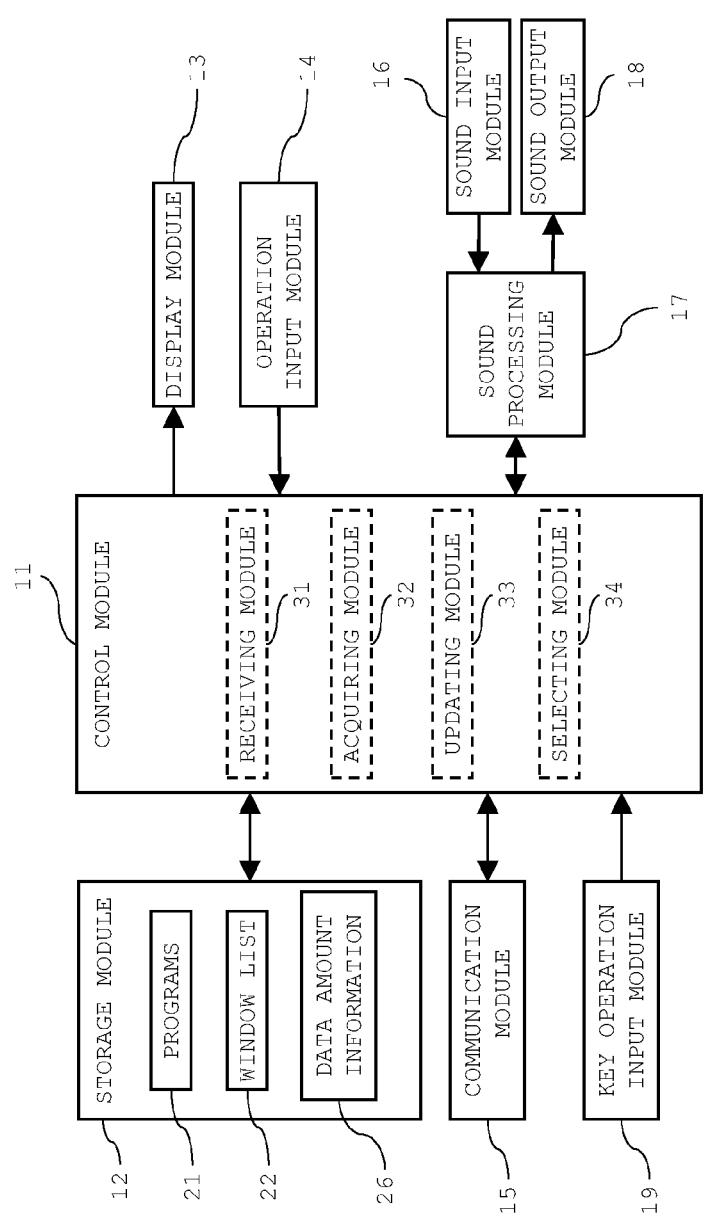
FIGS. 11A and 11B are respectively a block diagram showing an overall configuration of a mobile phone according to an embodiment, and a table showing data amount required to generate windows registered in a window list.

FIG. 11A is a block diagram showing an overall configuration of a mobile phone 1 according to a fourth modification. A storage module 12 stores data amount information 26 of information to be acquired to generate a window. The data amount information 26 is constituted of an amount of data c1 to c8 of information which an acquisition module 32 acquired last time to generate the windows W1 to W8 registered in a window list 22. A control module 11 is provided with a selecting module 34 which refers to the data amount information 26 and selects an update target window from the window list 22.

When a window is registered or updated in the window list 22, the control module 11 stores the above-mentioned amount of data ci for the window in the storage module 12.

FIG. 11B is a table showing the window list 22 and an example of the amount of data ci according to the windows W1 to W8 registered in the window list 22. In the example shown in FIG. 11B, for example, the amount of data c1 of the window W1 is 455 KB (kilobytes). The amount of data c2 of the window W2 is 109 KB (kilobytes).

Figure 12:
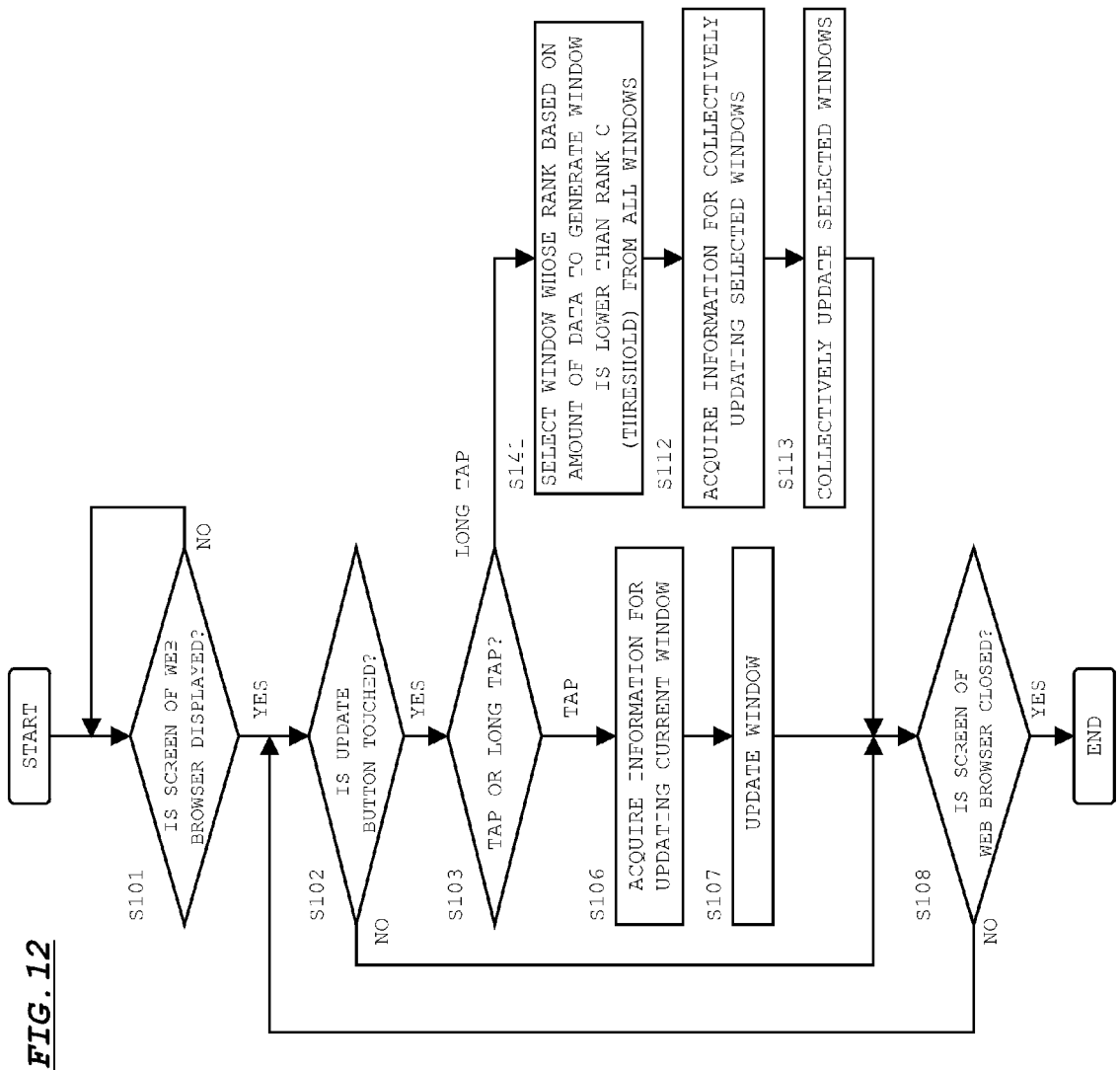
FIG. 12 is a flow chart showing an update process for updating the window registered in the window list according to the embodiment.

FIG. 12 is a flow chart showing an update process for updating a window registered in the window list 22. In the flow chart shown in FIG. 12, a process in Step S141 replaces the process in step S111 in the flow chart of FIG. 6.

In step S141, from windows W1 to W8 registered in the window list 22, the selecting module 34 selects the window whose amount of data ci is a rank C (C is a threshold. For example, C=3) or lower from the bottom. In the case of the example shown in FIG. 11B, the selecting module 34 selects three windows with small amount of data, i.e., the window W2 (lowest), W7 (third lowest), W8 (second lowest).

As described above, with the configuration of the fourth modification, the selecting module 34 uses the threshold C and selects the window with small amount of data among the windows W1 to W8 registered in the window list 22. The amount of data of information to be newly acquired to generate the windows W2, W7, W8 selected by the selecting module 34 is almost as small as the amount of data in the last acquisition. Thus, time which the acquisition module 32 needs to acquire necessary information for updating the windows W2, W7, W8 can be reduced.

In the above example, the selecting module 34 selects the window whose rank related to the amount of data is low (lower than the rank C from the bottom). However, the selecting module 34 may be configured to select the window whose rank related to the amount of data is high (for example, third rank from the top). In this case, information of a web page whose amount of data is large and considered to take more time for updating is acquired in advance and a corresponding window is updated. The user can avoid updating of a web page whose amount of data is large and may take more updating time, which is convenient.

In the example shown above, the selecting module 34 selects the window based on the rank related to the amount of data c1 to c8 for generating the windows W1 to W8. However, the selecting module 34 may be configured to select the window depending on whether the amount of data is smaller or larger than a predetermined threshold (for example, e.g. 256 KB, 1024 MB, 4096 MB) in place of the rank but also.

In the example shown above, from the windows W1 to W8 registered in the window list 22, the selecting module 34 selects the window, based on the amount of data when the information for generating the window was acquired last time. However, when information related to the amount of data of the information for generating a window which should be newly generated can be acquired in advance, the selecting module may select the window based on such information.

Fifth Modification

In a fifth modification, a communication module 15 transmits and receives a radio signal with a first communication method and a second communication method whose characteristics are different to each other. Electric power required for communications with the first communication method is smaller than electric power required for communications with the second communication method. For example, the first communication method is a CDMA1x method and the second communication method is a WiFi method (for example, a scheme according to the IEEE802.11n standard).

Figure 13:
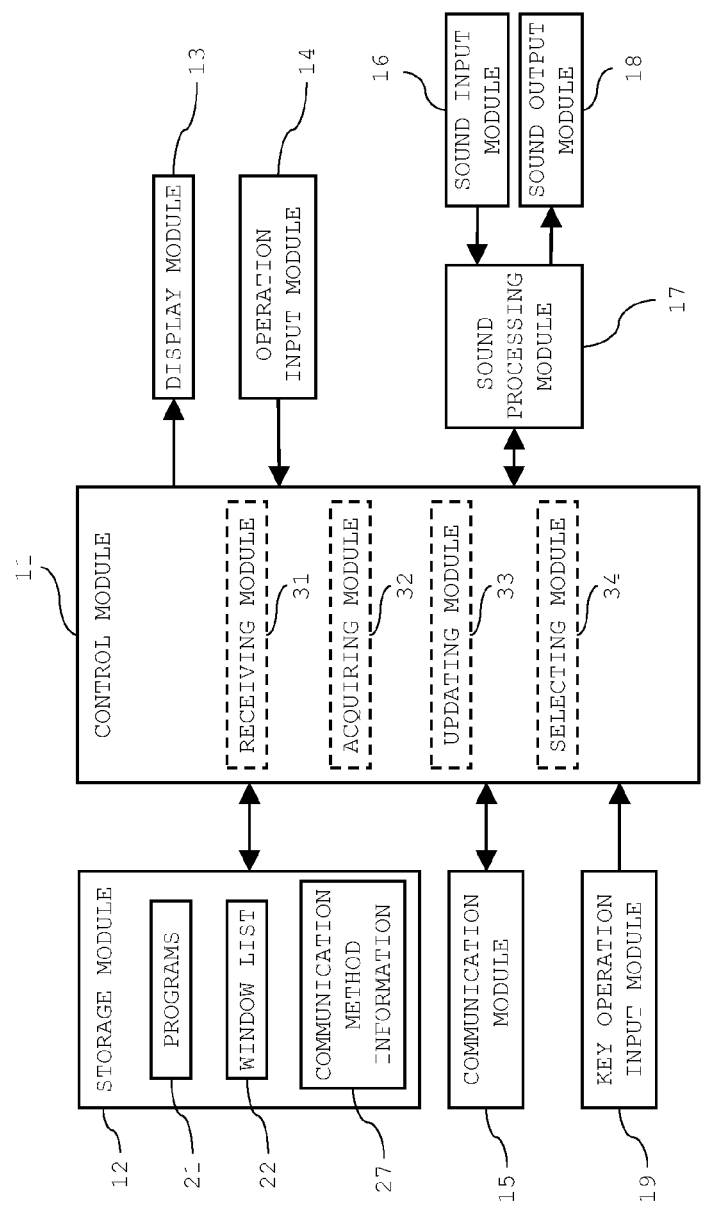
FIGS. 13A and 13B are respectively a block diagram showing an overall configuration of a mobile phone according to an embodiment, and a table listing communication methods used to acquire information for generating windows registered in a window list.

FIG. 13A is a blow diagram showing an overall configuration of a mobile phone 1 according to the fifth modification. A storage module 12 stores communication method information 27. The communication method information 27 is constituted of information showing whether information for generating windows W1 to W8 registered in a window list 22 is acquired with the first communication method or the second communication method.

A control module 11 is provided with a selecting module 34 which refers to the communication method information 27 and selects an update target window from the window list 22.

When information for generating the window Wi is acquired from a web server (S106, S112), the control module 11 stores in the storage module 12 the communication method used to acquire the information.

FIG. 13B is a table showing the window list 22 and an example of the communication method used to generate the windows W1 to W8 registered in the window list 22. In the example shown in FIG. 13B, the communication method related to the windows W1, W2, W5, W8 is the first communication method. The communication method related to the windows W3, W4, W6, W7 is the second communication method.

Figure 14:
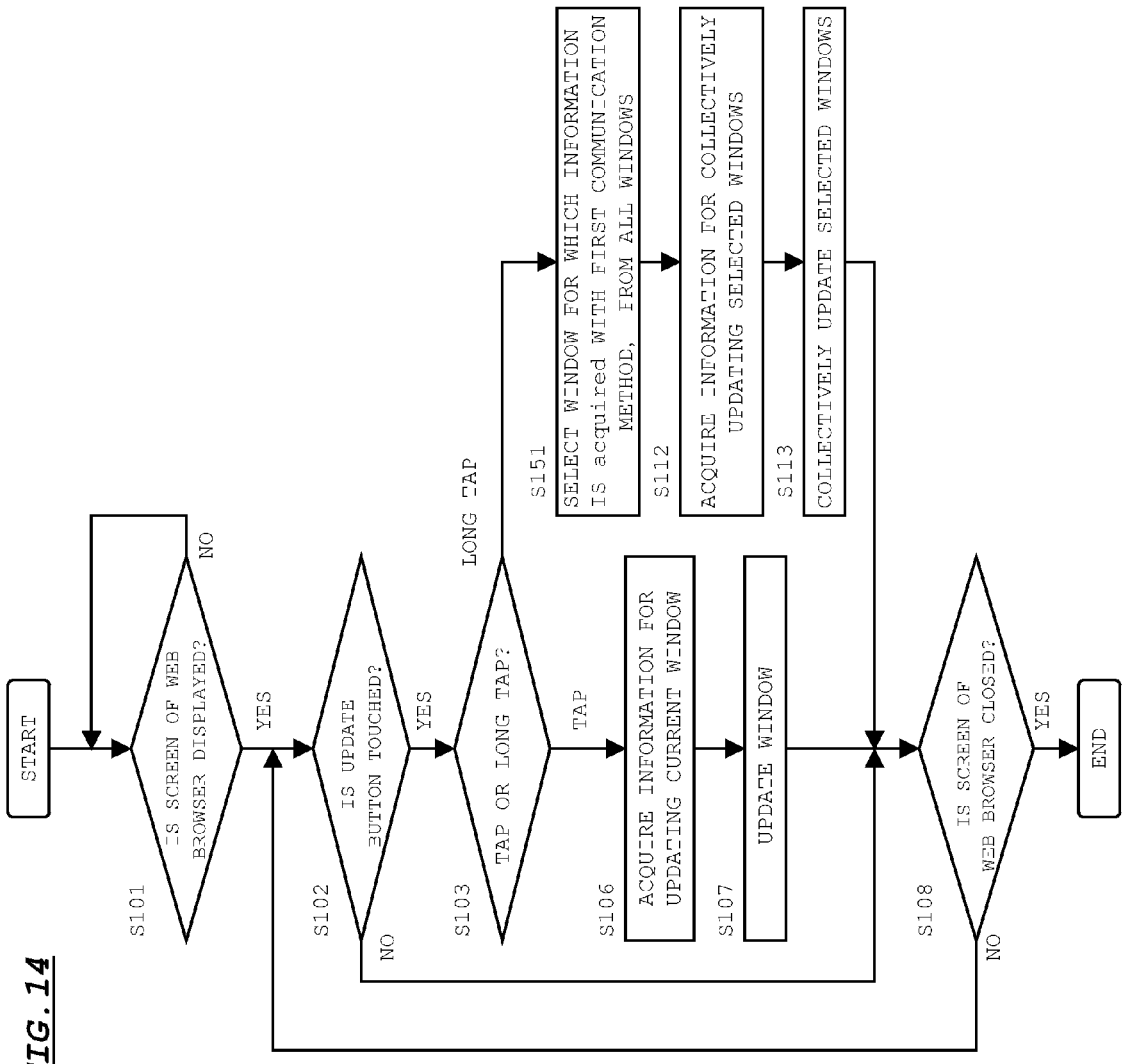
FIG. 14 is a flow chart showing an update process for updating the window registered in the window list according to the embodiment.

FIG. 14 is a flow chart showing an update process for updating the window registered in the window list 22, according to the fifth modification. In the flow chart shown in FIG. 14, a process in Step S151 replaces the process in Step S111 in the flow chart shown in FIG. 6.

In Step S151, a selecting module 34 refers to the communication method information 27 and selects the window for which the communication method is the first communication method requiring small electric power for communications from the windows W1 to W8 registered in the window list 22 (S151).

As described above, with the configuration of the fifth modification, from the windows W1 to W8 registered in the window list 22, the selecting module 34 selects the window for which information for generating the window is received with a specific communication method, i.e., the first communication method. Since the information for generating the window selected by the selecting module 34 is acquired (received by a communication module 15) with the first communication method which requires smaller electric power for communications than the second communication method (other communication method), the electric power required for collectively updating the windows can be reduced.

The selecting module 34 may be configured to select the window for which the information is received with the second communication method. In general, a communication rate and the electric power required for communications are in a trade-off relation. In this case, the communication rate in the second communication method is higher than the communication rate of the first communication method. Thus, time required for collective updating of the windows is reduced and user-friendliness of browsing improves.

The communication module 15 may be such configured that it can perform communications with three or more communication methods in place of with the two communication methods, i.e., the first communication method and the second communication method. The selecting module 34 can select a window corresponding to information received with a specific communication method of two or more communication methods, based on e.g. a communication rate, electric power required for communications, reception state of radio waves.

Others

The embodiment and the modifications of the invention have been described as above. The invention is not limited to the foregoing embodiment, and the embodiment of the invention may be modified in various ways other than the above.

Figure 15:
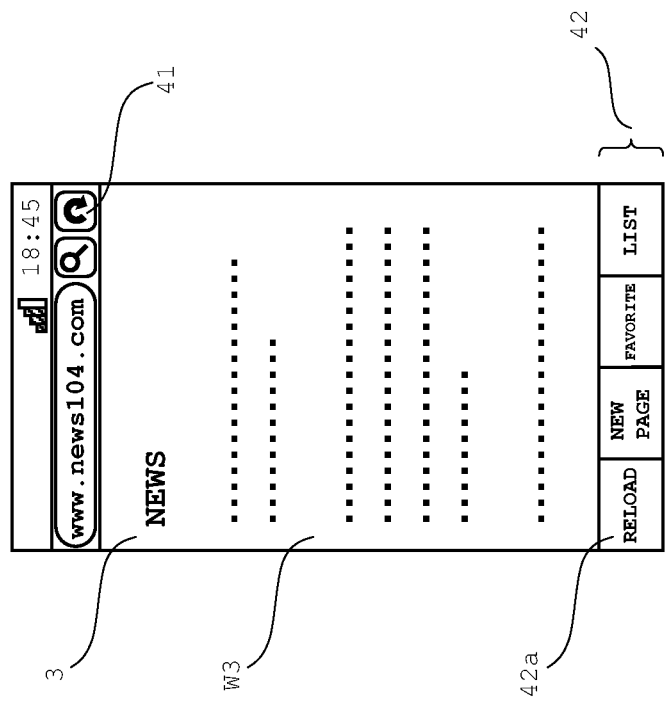
FIG. 15 is a diagram showing a display example of a window of a web page according to other modifications.

In the embodiment and in the first through fifth modifications described above, collective updating of a window is performed according to a manipulation on Update button 41. The collective updating may be performed in response to any manipulation of other aspects. For example, as shown in FIG. 15, such a configuration may be adopted that with a menu 42 presenting various types of operations displayed, windows are collectively updated when a receiving module 31 receives a manipulation (e.g., tap, long tap) on a predetermined area 42a (button) in the menu 42.

In the embodiment and in the first through fifth modifications described above, a configuration is described which when any of windows W1 to W8 is displayed on a display surface 3 (see FIG. 3B), the windows W1 to W8 are collectively updated. The windows W1 to W8 may be collectively updated based on the collective updating operation when any of the windows W1 to W8 is not displayed in place of when any of the windows W1 to W8 is displayed.

Figure 16:
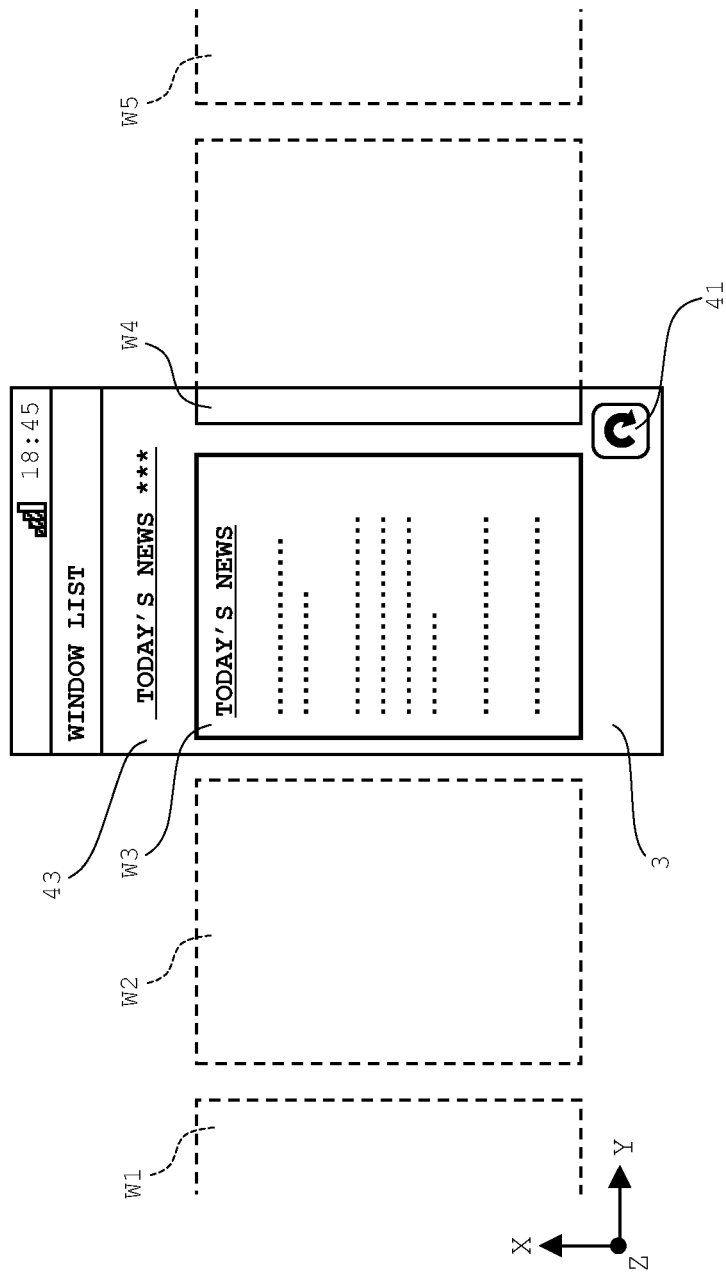
FIG. 16 is a diagram showing a display example of a list screen of a window registered in a window list according to other modifications.

For example, collective updating may be performed while a list screen 43 for listing the windows W1 to W8 is displayed on the display surface 3, as shown in FIG. 16. On the list screen 43, the reduced windows W1 to W8 are displayed so that they can be scrolled to a horizontal direction (axis Y direction), and the Update button 41 is displayed under the reduced windows W1 to W8. When a receiving module 31 detects a manipulation (long tap) on the update button 41, the windows W1 to W8 registered in the window list are collectively updated.

The thresholds related to the number of updates and the rank based on the number of updates, the update time and date and the rank based on the update time and date, and the amount of data and the rank based on the amount of data as described above in the first, third, and fourth modifications may be set as appropriate.

In the first modification, the selecting module 34 may select the window based on both threshold related to the number of updates and threshold related to the rank based on the number of updates. For example, the selecting module 34 may select the window which satisfies the conditions that the number of updates exceeds a predetermined times of N1 and/or that a rank based on the number of updates is a predetermined rank N2 or higher. A similar configuration is also possible with the third modification (selection based on the update time and date) and the fourth modification (selection based on the amount of data).

The configurations of the first through fifth modifications described above may be combined. For example, the selection conditions for selecting a window which is a target of collective updating in the processes in Steps S111, S121, S131, S141, S151 may be mutually combined through the use of logical operators of e.g. AND, OR, NOT. In this case, the selecting module 34 selects a window which is a target of collective updating, based on the selection condition constituted of a combination of respective selection conditions. For example, such a configuration may be adopted that the selecting module 34 selects a window which meets the selection condition in the first modification and/or the selection condition in the second modification but which does not meet the selection condition in the fifth modification.

In the embodiment, the invention is applied to mobile phones called smartphones. Alternatively, the invention may be applied to other types of mobile phones such as straight-type mobile phones, foldable mobile phones, and slidable mobile phones.

Furthermore, the invention is not limited to the mobile phones. Alternatively, the invention is applicable to various communication devices including mobile terminal devices such as PDAs (Personal Digital Assistants), tablet PCs, and electronic book readers.

The embodiment of the invention may be changed or modified in various ways as necessary, as far as such changes and modifications do not depart from the scope of the claims of the invention hereinafter defined.

What is claimed is:

1. A mobile terminal device comprising:
a storage module which stores two or more screens of web pages;
a receiving module which receives an operation to collectively update predetermined screens of the web pages stored in the storage module;
an acquisition module which acquires information for generating the predetermined screens of the web pages through a communication network, in response to the operation; and
an updating module which collectively updates, based on the acquired information, the predetermined screens of the web pages stored in the storage module,
wherein the acquisition module selectively acquires the information for generating the screens of the web pages which satisfy a predetermined selection condition for limiting an update target, among the screens of the web pages stored in the storage module,
wherein the updating module collectively updates the predetermined screens of the web pages corresponding to the information selectively acquired, and
wherein the predetermined selection condition includes at least one of a condition that an amount of data for generating the screen of the web page is larger than a predetermined threshold and a condition that a rank based on the amount of data is higher than a predetermined rank.

2. A mobile terminal device comprising:
a storage module which stores two or more screens of web pages;
a receiving module which receives an operation to collectively update predetermined screens of the web pages stored in the storage module;
an acquisition module which acquires information for generating the predetermined screens of the web pages through a communication network, in response to the operation; and
an updating module which collectively updates, based on the acquired information, the predetermined screens of the web pages stored in the storage module,
wherein the acquisition module selectively acquires the information for generating the screens of the web pages which satisfy a predetermined selection condition for limiting an update target, among the screens of the web pages stored in the storage module,
wherein the updating module collectively updates the predetermined screens of the web pages corresponding to the information selectively acquired, and
wherein the predetermined selection condition includes at least one of a condition that an amount of data for generating the screen of the web page is smaller than a predetermined threshold and a condition that a rank based on the amount of data is lower than a predetermined rank.

3. A mobile terminal device comprising:

a storage module which stores two or more screens of web pages;

a receiving module which receives an operation to collectively update predetermined screens of the web pages stored in the storage module;

an acquisition module which acquires information for generating the predetermined screens of the web pages through a communication network, in response to the operation;

an updating module which collectively updates, based on the acquired information, the predetermined screens of the web pages stored in the storage module; and a communication module which can communicate with two or more communication methods and is configured to receive the information for generating the screen of the web page under control of the acquisition module, wherein the acquisition module selectively acquires the information for generating the screens of the web pages which satisfy a predetermined selection condition for limiting an update target, among the screens of the web pages stored in the storage module, wherein the updating module collectively updates the predetermined screens of the web pages corresponding to the information selectively acquired, and wherein the predetermined selection condition includes a condition that the information is acquired with a specific communication method in which electric power required by the communication module for communications is lower than the other communication methods in the two or more communication methods.

4. A mobile terminal device comprising:

a storage module which stores two or more screens of web pages;

a receiving module which receives an operation to collectively update predetermined screens of the web pages stored in the storage module;

an acquisition module which acquires information for generating the predetermined screens of the web pages through a communication network, in response to the operation;

an updating module which collectively updates, based on the acquired information, the predetermined screens of the web pages stored in the storage module; and a communication module which can communicate with two or more communication methods and is configured to receive the information for generating the screen of the web page under control of the acquisition module, wherein the acquisition module selectively acquires the information for generating the screens of the web pages which satisfy a predetermined selection condition for limiting an update target, among the screens of the web pages stored in the storage module, wherein the updating module collectively updates the predetermined screens of the web pages corresponding to the information selectively acquired, and wherein the predetermined selection condition includes a condition that the information is acquired with a specific communication method in which a communication rate with the communication module is higher than the other communication methods in the two or more communication methods.

* * * * *